United States Patent
Li et al.

(10) Patent No.: US 10,503,634 B1
(45) Date of Patent: Dec. 10, 2019

(54) SEMANTIC COMPARISON OF COMPUTER COMPILER TRACES

(71) Applicant: Microsoft Technology Licensing, LLC, Redmond, WA (US)

(72) Inventors: Xiang Li, Bellevue, WA (US); Ivan Nevraev, Redmond, WA (US); David McCarthy Peixotto, Seattle, WA (US); Marcelo Lopez Ruiz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/989,973

(22) Filed: May 25, 2018

(51) Int. Cl.
*G06F 9/44* (2018.01)
*G06F 11/36* (2006.01)
*G06F 8/40* (2018.01)

(52) U.S. Cl.
CPC ............ *G06F 11/3692* (2013.01); *G06F 8/40* (2013.01)

(58) Field of Classification Search
CPC ............................... G06F 11/3692; G06F 8/40
See application file for complete search history.

(56) References Cited

U.S. PATENT DOCUMENTS

| | | | |
|---|---|---|---|
| 2008/0235676 A1* | 9/2008 | Serebryany | G06F 8/433 717/154 |
| 2012/0096428 A1* | 4/2012 | Moosmann | G05B 19/042 717/106 |
| 2014/0173552 A1* | 6/2014 | Beale | G06F 8/41 717/106 |
| 2017/0177330 A1* | 6/2017 | Yu | G06F 8/71 |

OTHER PUBLICATIONS

Stefano Dissegna et al., An Abstract Interpretation-Based Model of Tracing Just-in-Time Compilation, ACM, 2016, retrieved online on Jul. 2, 2019, pp. 1-70. Retrieved from the Internet: <URL: http://delivery.acm.org/10.1145/2860000/2853131/a7-dissegna.pdf?>. (Year: 2016).*

Lotfi, Puyan, "Mir-canon: A new tool for canonicalizing MIR for cleaner diffing.", Retrieved From https://groups.google.com/forum/#!topic/llvm-dev/uxRuj4ri-I0, Aug. 16, 2017, 1 Page.

Crussell, et al., "AnDarwin: Scalable Detection of Semantically Similar Android Applications", In Journal of the European Symposium on Research in Computer Security, Sep. 9, 2013, pp. 182-199.

"International Search Report and Written Opinion Issued in PCT Application No. PCT/US2019/031940", dated Jul. 16, 2019, 11 Pages.

* cited by examiner

*Primary Examiner* — Hanh Thi-Minh Bui
(74) *Attorney, Agent, or Firm* — Klarquist Sparkman, LLP

(57) ABSTRACT

Techniques are described for semantically comparing machine code traces generated by compilers that compile computer software code. For example, a trace of machine code generated by a compiler can be obtained. The trace can be transformed into a set of expressions in a uniform expression format (e.g., by performing translation of the trace instructions into corresponding expressions and/or by performing other transformations). The set of expressions in the uniform expression format can be compared to other sets of expressions in the uniform expression format (e.g., other sets of expressions created from traces of machine code from other compilers). Results of the comparison can comprise indications of whether the sets of expressions match.

16 Claims, 9 Drawing Sheets

FIG. 4
(Prior Art)

```
Step(489): v_mul_f32 v27, v29, v18                                    410
Input:
V29: 0X36AE4F7E(5.194858E-06)
v18: 0x46BB8900(24009)
output:
v27: 0x3DFF5672(9.1246766)

Step(492): v_mul_f32 v51, v43, v27
Input:
v43: 9x434BC90E(203.7854)
v27: 0x3DFF5672(9.1246766)
Output:
v51: 0x41CB4215(25.40727)

Step(599): v_mov_b32 v29, 0
Input:
output:
v29: 0x00000000(0)

Step(519): v_mul_f32 v0, v34, v18
Input:
v34: 0x37777410(1.474937E-05)
v18: 9x46BB8000(24000)
output:
v0: ex3EB53D82(9.3539849)

Step(522): v_mac_f32 v51, v0, v29
Input:
v0: ex3EB53D82(9.3539849)
29: 0x00000000(0)
Output:
V51: 0x00000000(0)

Step(523): v_mad_f32 v23, v23, s41, -0.5
Input:
v23: 0x4402A000(522.5)
s41: 0x3A91A2B4(0.001111111)
Output:
v23: 0x3DA4FA50(0.08055556)
```

FIG. 5

510 inst_29 load: inst_21, 0x00000027, ;
inst_30 merge: inst_22, inst_23, inst_24, inst_25, ... ;
inst_31 merge: s5, 0, ;
inst_32 load: inst_31, 0x0000000c, ;
inst_33 load: inst_31, 0x0000000d, ;
inst_34 load: inst_31, 0x0000000e, ;
inst_35 load: inst_31, 0x0000000f, ;
inst_36 merge: inst_32, inst_33, inst_34, inst_35, ;
inst_37 input_buffer_end: inst_6, inst_7, inst_8, ... ;
inst_38 interp_p1: v0, attr0.x, s16, ;
inst_39 interp_p1: v0, attr0.y, s16, ;
inst_40 interp_p1: v0, attr0.z, s16, ;
inst_41 level_1: inst_38, inst_39, inst_40, inst_21, ... ;
inst_42 interp_p2: inst_38, v1, attr0.x, s16, ;
inst_43 interp_p2: inst_39, v1, attr0.y, s16, ;
inst_44 interp_p2: inst_40, v1, attr0.z, s16, ;
inst_45 level_2: inst_42, inst_43, inst_44, inst_22, ... ;
inst_46 level_3: inst_30, inst_5, inst_19, inst_36, ;
inst_47 level_4: inst_6, inst_7, inst_8, inst_9, ... ;
inst_48 skeleton: -0.5, -1.0, 2.0, v4, v6, inst_6, ... ;
inst_49 skeleton: -0.5, -1.0, -2.0, v5, v6, inst_7, ... ;
inst_50 level_5: inst_48, inst_49, ;
inst_51 merge: inst_48, inst_49, ;
inst_52 level_6: inst_51, ;

530

520 inst_29 load: inst_21, 0x00000027, ;
inst_30 merge: inst_22, inst_23, inst_24, inst_25, ... ;
inst_31 merge: s5, 0, ;
inst_32 load: inst_31, 0x0000000c, ;
inst_33 load: inst_31, 0x0000000d, ;
inst_34 load: inst_31, 0x0000000e, ;
inst_35 load: inst_31, 0x0000000f, ;
inst_36 merge: inst_32, inst_33, inst_34, inst_35, ;
inst_37 input_buffer_end: inst_6, inst_7, inst_8, ... ;
inst_38 interp_p1: v0, attr1.x, s16, ;
inst_39 interp_p1: v0, attr1.y, s16, ;
inst_40 interp_p1: v0, attr1.z, s16, ;
inst_41 level_1: inst_38, inst_39, inst_40, inst_21, ... ;
inst_42 interp_p2: inst_38, v1, attr1.x, s16, ;
inst_43 interp_p2: inst_39, v1, attr1.y, s16, ;
inst_44 interp_p2: inst_40, v1, attr1.z, s16, ;
inst_45 level_2: inst_42, inst_43, inst_44, inst_22, ... ;
inst_46 level_3: inst_30, inst_5, inst_19, inst_36, ;
inst_47 level_4: inst_6, inst_7, inst_8, inst_9, ... ;
inst_48 skeleton: -0.5, -1.0, 2.0, v4, v6, inst_6, ... ;
inst_49 skeleton: -0.5, -1.0, -2.0, v5, v6, inst_7, ... ;
inst_50 level_5: inst_48, inst_49, ;
inst_51 merge: inst_48, inst_49, ;
inst_52 level_6: inst_51, ;

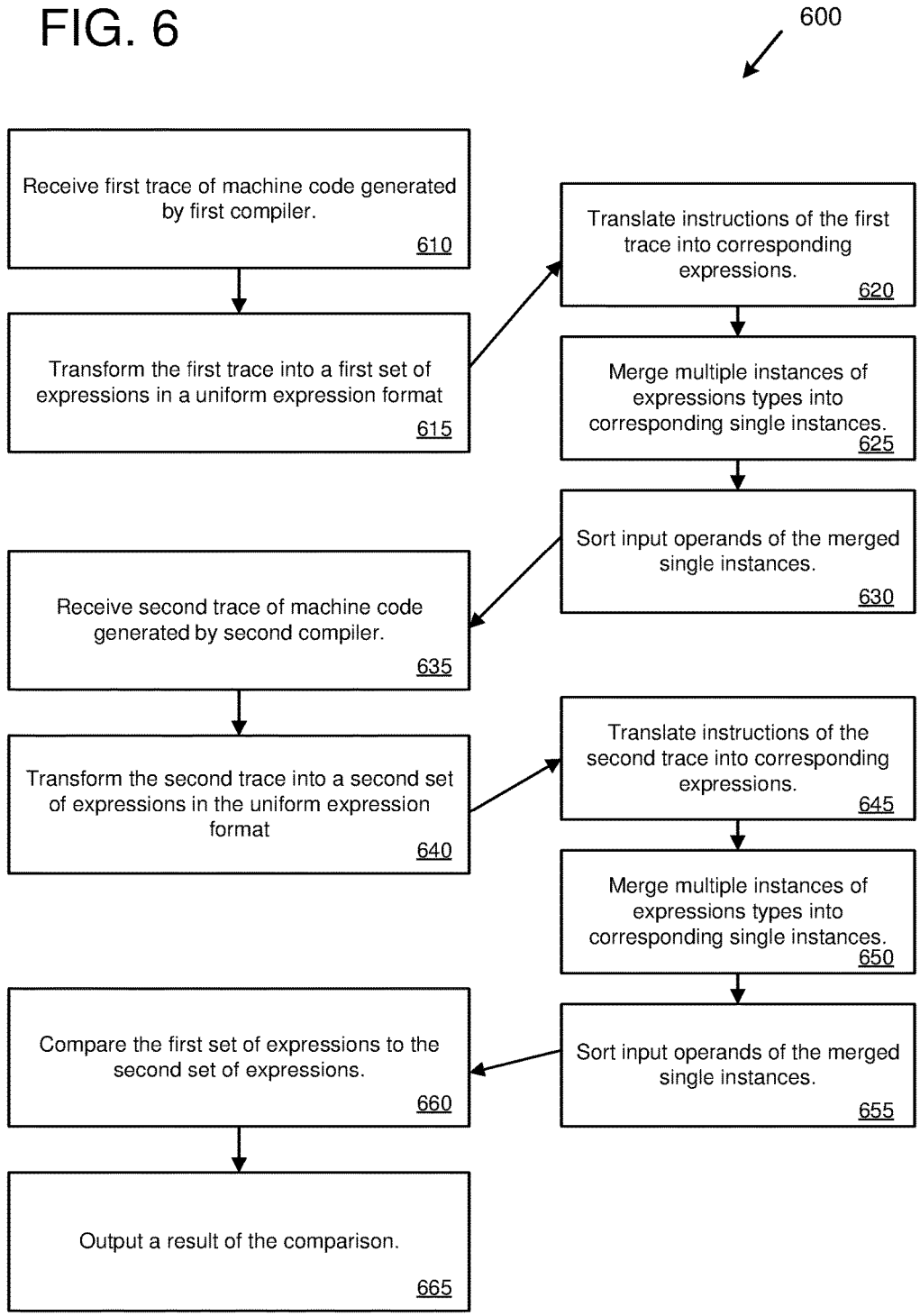

SEMANTIC COMPARISON OF COMPUTER COMPILER TRACES

BACKGROUND

Developing compilers for computer software is a difficult task. In particular, finding semantic errors in a compiler is often very difficult. In some situations, the output of one compiler can be compared to the output of another compiler (e.g., a reference compiler) in order to try to determine if a compiler is operating correctly. However, due to the different ways in which a compiler can generate its output (e.g., differences in instructions used, differences in instruction scheduling and register allocation, differences in optimizations, etc.), it may not be possible to directly compare the results, except for simple cases.

Therefore, there exists ample opportunity for improvement in technologies related to comparison of compiler results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for semantically comparing machine code traces. For example, a trace of machine code generated by a compiler can be obtained. The trace can be transformed into a set of expressions in a uniform expression format (e.g., by performing translation of the trace instructions into corresponding expressions and/or by performing other transformations). The set of expressions in the uniform expression format can be compared to other sets of expressions in the uniform expression format (e.g., other sets of expressions created from traces of machine code from other compilers). Results of the comparison can comprise indications of whether the sets of expressions match.

For example, a method can be provided for semantically comparing machine code traces. The method comprises receiving a first trace of machine code generated by a first compiler, where the first trace comprises a plurality of instructions. The method further comprises transforming the first trace into a first set of expressions in a uniform expression format that have the same semantic meaning as the first trace. The transforming comprises, for each of the plurality of instructions of the first trace, translating the instruction into an expression of the instruction in the uniform expression format, merging multiple instances of one or more expression types into corresponding single instances of the one or more expression types in the uniform expression format, and sorting input operands of the merged single instances of the one or more expression types into a uniform order. The method further comprises receiving a second trace of machine code generated by a second compiler, where the second trace comprises a plurality of instructions. The method further comprises transforming the second trace into a second set of expressions in the uniform expression format that have the same semantic meaning as the second trace. The transforming comprises, for each of the plurality of instructions of the second trace, translating the instruction into an expression of the instruction in the uniform expression format, merging multiple instances of one or more expression types into corresponding single instances of the one or more expression types in the uniform expression format, and sorting input operands of the merged single instances of the one or more expression types into a uniform order. The method further comprises comparing the first set of expressions in the uniform expression format to the second set of expressions in the uniform expression format, and outputting a result of the comparison comprising an indication of whether the first set of expressions in the uniform expression format matches the second set of expressions in the uniform expression format.

As another example, a method can comprise transforming a first machine code program generated by a first compiler into a first set of expressions in a uniform expression format that have the same semantic meaning as the first machine code program, where the first machine code program comprises a plurality of instructions. The transforming can comprise for each of the plurality of instructions of the first machine code program, translating the instruction into an expression of the instruction in the uniform expression format, merging multiple expression instances, having the same expression type, into a single instance of the expression in the uniform expression format, and sorting input operands of the merged single instance of the expression into a uniform order. The method can further comprise comparing the first set of expressions in the uniform expression format to a second set of expressions in the uniform expression format, and outputting a result of the comparison comprising an indication of whether the first set of expressions in the uniform expression format matches the second set of expressions in the uniform expression format.

As another example, a method can comprise receiving a first trace of machine code generated by a first compiler, where the first trace comprises a plurality of instructions. The method can further comprise transforming the first trace into a first set of expressions in a uniform expression format that have the same semantic meaning as the first trace, comprising for each of the plurality of instructions of the first trace, translating the instruction into an expression of the instruction in the uniform expression format. The method can further comprise receiving a second trace of machine code generated by a second compiler, where the second trace comprises a plurality of instructions. The method can further comprise transforming the second trace into a second set of expressions in the uniform expression format that have the same semantic meaning as the second trace, comprising for each of the plurality of instructions of the second trace, translating the instruction into an expression of the instruction in the uniform expression format. The method can further comprise outputting an indication of whether the first set of expressions in the uniform expression format matches the second set of expressions in the uniform expression format.

As described herein, a variety of other features and advantages can be incorporated into the technologies as desired.

BRIEF DESCRIPTION OF THE DRAWINGS

FIG. 4 depicts an example trace of machine code generated by a compiler.

FIG. 5 depicts an example comparison between expressions in the uniform expression format.

FIG. 6 is a flowchart of an example method for semantically comparing machine code traces using the uniform expression format.

DETAILED DESCRIPTION

Overview

Figure 1:
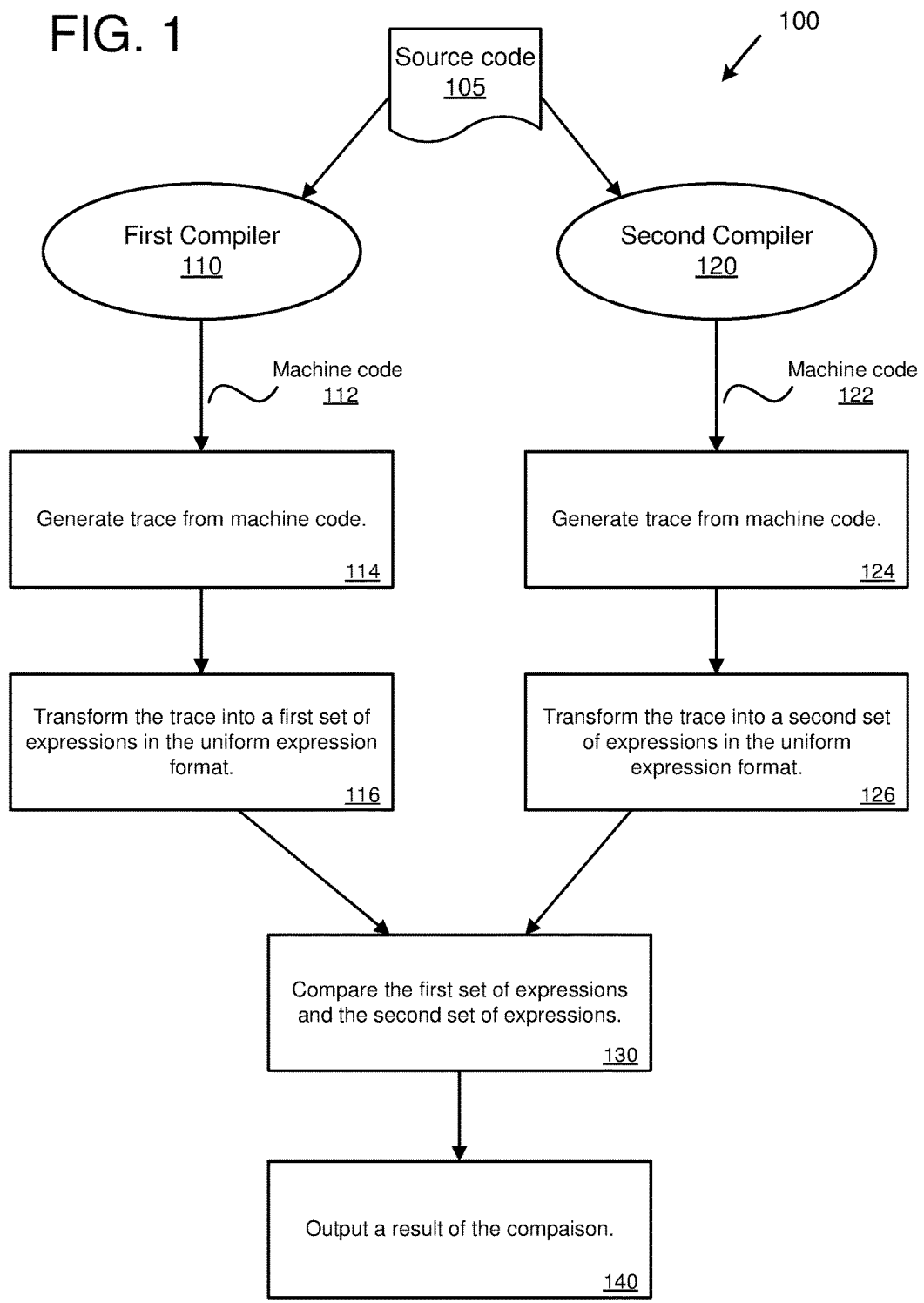
FIG. 1 is diagram of an example environment for semantically comparing machine code traces.

Technologies are described for semantically comparing machine code traces (e.g., produced by different compilers) to identify errors in computer compilers. For example, traces can be obtained from a first compiler and a second compiler. The instructions of each trace can be transformed into a uniform expression format. Additional processing can be performed, such as merging multiple instances of the same expression type (e.g., of the same opcode), sorting input operands of merged expressions, and performing optimizations. After the traces have been converted to the uniform expression format, the traces can be compared to identify any differences. The differences can be used to find errors in the compilers. For example, a first trace can be from a compiler being developed or tested and a second trace can be from a reference compiler. The semantic comparison of the traces can be performed to determine whether the first trace from the compiler under development matches the second trace from the reference compiler. If the traces do not match, then differences in the uniform expressions can be used to try and find the source of the error (e.g., to locate the error in the compiler under development).

Compiler development is often a difficult and complex process. When debugging a compiler, it can be very hard to find the source of an error, such as a semantic error. In some situations, it is possible to compare the result of a compiler being developed to a reference compiler. For example, the same source code input can be used to generate machine code (also called machine code output or a machine code program) from a compiler being developed and a reference compiler. The two machine code outputs (or two traces of instructions generated from the two machine code outputs) can then be compared directly (e.g., using a text compare tool, such as the diff comparison utility). However, simply comparing the two machine code outputs directly is only useful in identifying simple errors. Furthermore, due to compiler differences, it may not be possible to directly compare machine code outputs being generated by different compilers. For example, a first compiler may use one form of an instruction (e.g., a MAD instruction) and another compiler may use a different form of an instruction (e.g., separate MUL and ADD instructions) to achieve the same result. Other differences can exist as well, such as differences in instructions used, differences in instruction and/or operand order, differences in optimizations, differences in instruction scheduling techniques, differences in register allocation techniques, etc. As a result, a direct comparison may indicate many differences, only some of which may be "real" differences (e.g., differences that indicate an error in the compiler instead of a difference in the instructions that actually have the same semantic meaning and therefore produce the same result). In other words, the machine code instruction output of two compilers can appear very different while still having the same semantic meaning.

In the technologies described herein, machine code traces are semantically compared to determine the semantic difference between them. The machine code traces are generated from compiler results. For example, a compiler compiles a higher level language (e.g., C, C++, C#, Swift, Java, etc.) into machine code. A trace is then generated from the instructions of the machine code. The trace (also called a machine code trace) represents the actual machine code instructions that have been executed on a computing device, which are not necessarily the same instructions as those in the machine code. For example, the machine code instructions in the machine code output from the compiler could include a branch instruction along with a number of potential next instructions that depend on the outcome of the branch instruction. The trace will contain the actual machine code instructions that are actually executed. In this example, the trace would contain the branch instruction and the actual next instruction that is executed (e.g., other potential instructions from the branch may not be present in the trace). In some implementations, the trace contains additional information such as input and output registers, register values, debugging information, etc.

Due to the difficulty in directly comparing the traces, they are first transformed into a uniform expression format. Using the same uniform expression format allows a trace generated from machine code of a first compiler to be directly compared to a trace generated from machine code of a second compiler. The uniform expression format also maintains the same semantic meaning of the instructions in the trace. For example, a single instruction of a trace may be converted into an expression of the uniform expression format that uses multiple instructions, but that still has the same semantic meaning as the single instruction and that produces the same results.

After the traces have been converted into expressions in the uniform expression format, they can be compared to determine whether they are semantically the same or semantically different. Differences from the comparison can be used to identify and locate errors in the compiler. For example, differences in specific expressions or groups of expressions in the uniform expression format can be used to trace errors back to machine code instructions and ultimately to compiler code.

In some implementations, the technologies described herein are used to semantically compare machine code traces generated from compilers used in computer graphics applications. For example, the technologies can be used during development of a shader compiler that compiles High Level Shading Language (HLSL) to machine code for implementation on a graphics processing unit (GPU).

In some implementations, the technologies described herein are used to semantically compare machine code instructions directly without generating traces from the machine code instructions. For example, a first compiler can generate a first machine code program (e.g., a first set of machine code instructions) and a second compiler can generate a second machine code program (e.g., a second set of machine code instructions). The instructions of each machine code program can be transformed into the uniform expression format. Additional processing can be performed, such as merging multiple instances of the same expression type, sorting input operands of merged expressions, and performing optimizations. After the machine code programs have been converted to the uniform expression format, the machine code programs can be compared to identify any differences. The differences can be used to find errors in the compilers. For example, a first machine code program can be from a compiler being developed or tested and a second machine code program can be from a reference compiler. The semantic comparison of the machine code programs can be performed to determine whether the first machine code program from the compiler under development matches the second machine code program from the reference compiler. If the machine code programs do not match, then differences in the uniform expressions can be used to try and find the source of the error (e.g., to locate the error in the compiler under development.

In some implementations, when semantically comparing machine code instructions directly (without generating traces), additional processing is performed in order to create a uniform representation of the control flow. For example, the instructions of the machine code programs of two different compilers may represent control flow differently. When transforming the instructions of the machine code programs into the uniform expression format, the control flow represented by the machine code instructions can be transformed into a uniform representation. The following control flow examples are described in terms of source code instructions, rather than machine code instructions, for ease of illustration. For example, the following control flow:
 int x=1;
 if (a>0)
 x=2;
can be transformed into the following in the uniform expression format:
 x=a>0?2:1;
As another example, the following control flow:
 int x=1;
 if (x>1)
 x=3;
could be transformed into the following in the uniform expression format:
 x=3;
As another example, the following control flow:
 int x=0;
 for (int i=0;i<4;i++) {
 x+=3*i;
 }
could be transformed into the following in the uniform expression format:
 int x=0;
 int j=0;
 for (int i=0;i<4;i++) {
 x+=j;
 j+=3;
 }
In some cases, all of the instructions of the traces (or machine code programs) can be transformed into the uniform expression and compared. However, in general not all of the instructions need to be transformed and compared. For example, corresponding subsets of instructions from two traces (or two machine code programs) can be transformed in to the uniform expression format and compared (e.g., subsets for specific portions of code or functions being tested).

Environment for Semantically Comparing Machine Code Traces

In the technologies described herein, machine code traces are converted into expressions in the uniform expression format and compared. The results of the comparison can be used to determine any semantic differences between the machine code traces.

FIG. 1 is diagram of an example environment 100 for semantically comparing machine code traces. As depicted in the example environment, there are two compilers, a first compiler 110 and a second compiler 120. The first compiler 110 and the second compiler 120 are compiling the same source code 105. The first compiler 110 and the second compiler 120 can be running on the same computing device (e.g., the same desktop, laptop, or server computer) or on different computing devices.

The first compiler 110 compiles the source code 105 and produces machine code 112. At 114, a trace is generated from the machine code 112. The trace contains machine code instructions. For example, the machine code can be executed on the computing device in order to generate the trace. In some implementations, the trace contains additional information such as input and output registers and/or register values.

At 116, the trace is transformed into a first set of expressions in the uniform expression format. For example, each of the instructions in the trace can be converted into a corresponding expression (e.g., which can comprise one or more instructions) in the uniform expression format. In some cases, a single instruction in the trace can be converted into multiple instructions in the expression. In some cases, a single instruction in the trace can be converted into a single instruction in the expression. Transforming an instruction from the trace into the expression in the uniform expression format can also change the type of the instruction (e.g., a single MAD instruction can be transformed into an expression that uses both a MUL instruction and an ADD instruction).

Transforming the trace into the first set of expressions in the uniform expression format can include additional operations. In some implementations, multiple instances of expression types are merged into corresponding single instances of the expression types. For example, a number of MUL type expressions can be merged into a single MUL type expression. In some implementations, input operands of merged single instances of the expression types are sorted. For example, a merged single instance of a MUL type expression may have a number of input operands. The input operands can be sorted according to pre-determined criteria. In some implementations, various optimizations can be performed. For example, a multiply by zero (e.g., MUL 0) instruction of the trace can be transformed into an expression that represents the instruction as a value of zero (without the MUL operator).

The second compiler 120 compiles the source code 105 and produces machine code 122. At 124, a trace is generated from the machine code 122. The trace contains machine code instructions. For example, the machine code can be executed on the computing device in order to generate the trace. In some implementations, the trace contains additional information such as input and output registers and/or register values.

At 126, the trace is transformed into a second set of expressions in the uniform expression format. For example, each of the instructions in the trace can be converted into a corresponding expression (e.g., which can comprise one or more instructions) in the uniform expression format.

At 130, the first set of expressions and the second set of expressions are compared. Because both the first set of expressions and the second set of expressions are in the uniform expression format, they can be directly compared.

In some implementations, the first and second set of expressions are converted into a text format for comparison.

At 140, a result of the comparison is output. For example, the first set of expressions and the second set of expressions can be displayed on a computer display. The display can indicate where the first set of expressions and the second set of expressions differ (e.g., by highlighting, color coding, or using another type of visual indication).

The result of the comparison can be used to debug the compiler or compilers used. For example, the differences between the instructions in the sets of expressions can be used to locate compiler errors (e.g., by finding the beginning of the differences, such as the first instruction where the differences occur between the sets of expressions).

In some situations, even if two sets of expressions in the uniform expression format are the same (they match), their associated compiler output (e.g., machine code or traces) could produce slightly different results. For example, differences in instruction order between two different machine code outputs can result in differences in precision in numerical results even though the semantic meaning of the instructions is the same. Such differences in precision are typically very small.

Uniform Expression Format

In the technologies described herein, a uniform expression format is used to compare traces of machine code generated by compilers. The uniform expression format provides a uniform format into which the different machine code traces (generated by different compilers) are transformed. The uniform expression format maintains the same semantic meaning as the traces of machine code. For example, the instructions in the traces are transformed into expressions in the uniform expression format that have the same semantic meaning as the instructions in the traces.

Figure 2:
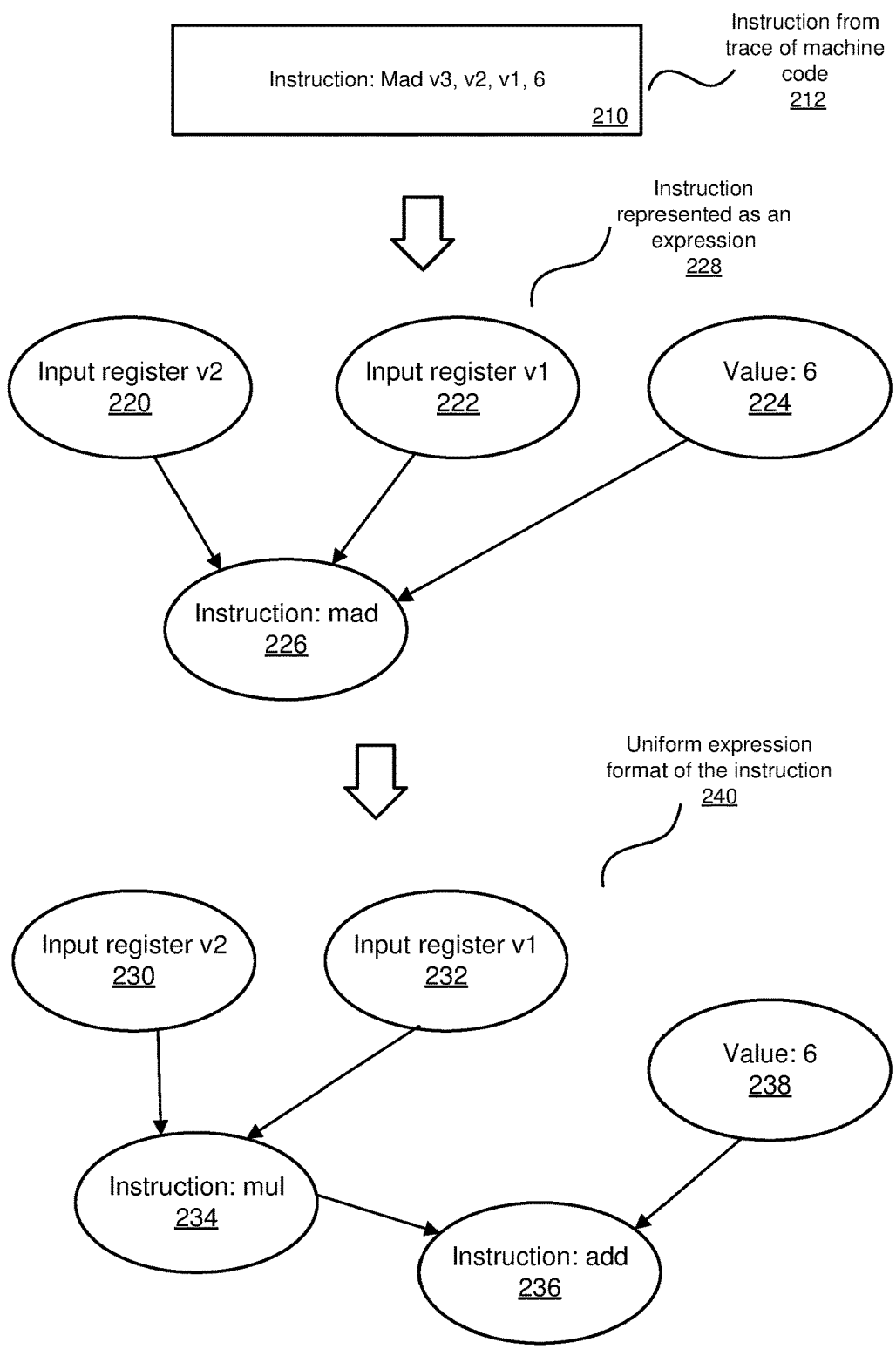
FIG. 2 is a diagram depicting an example transformation of a MAD instruction from a machine code trace into an expression in a uniform expression format.

FIG. 2 is a diagram depicting an example transformation of a multiply and add (MAD) instruction from a machine code trace into an expression in the uniform expression format. As depicted at 212, the instruction from the machine code trace is a MAD instruction 210 that is a single instruction for multiplying two operands and adding a third operand. Specifically, the MAD instruction 210 multiplies input registers v3 and v2, and then adds the value of 6 to the result.

As depicted at 228, the MAD instruction 210 has been converted into an expression, which can also be called an intermediate expression. The expression represents the MAD instruction 210, but it is not yet in the uniform expression format. The expression depicts the MAD instruction at 226 along with the three operands, the input register v2 220, the input register v1 222, and the value of 6 224.

As depicted at 240, the MAD instruction 210 has been converted into the uniform expression format. Specifically, the MAD instruction 210 has been converted into an expression in the uniform expression format that uses two separate instructions. The first instruction is a multiply (MUL) instruction 234 that multiplies input register v2 230 and input register v1 232. The second instruction is an ADD instruction 236 that adds the result of the MUL instruction 234 and the value of 6 238.

As illustrated by FIG. 2, the instruction 210 from the machine code trace has the same semantic meaning as the expression, depicted at 240, in the uniform expression format. Specifically, both the instruction 210 and the expression depicted at 240 result in input register v1 and v2 being multiplied and the value of 6 added to the result.

Converting the instructions from the machine code trace into expressions in the uniform expression format allows the machine code traces to be compared more efficiently. For example, one compiler could create machine code instructions that use MAD instructions while a second compiler could create machine code instructions that do not use MAD instructions (e.g., that use separate MUL and ADD instructions instead). Comparing such machine code traces directly would result in many differences between the use of MAD versus MUL and ADD instructions. By converting both to the uniform expression format, where MAD instructions are transformed to expressions using MUL and ADD instructions, the two sets of expressions (one from each of the machine code traces) can be directly compared.

Converting the instructions from the machine code trace into expressions in the uniform expression format also provides additional benefits in that instruction scheduling and register allocation can be avoided. For example, the uniform expression format can be created by relying (e.g., only relying) on dependency of the instructions, without regard to instruction scheduling and register allocation.

In some implementations, expressions in the uniform expression format are represented as a tree structure with the instructions and operands represented as nodes, such as the tree structures depicted at 228 and 240. In some implementations, the tree structure represents instructions, instruction operands, and the dependencies between instructions, and does not reflect instruction scheduling or register allocation details.

Figure 3:
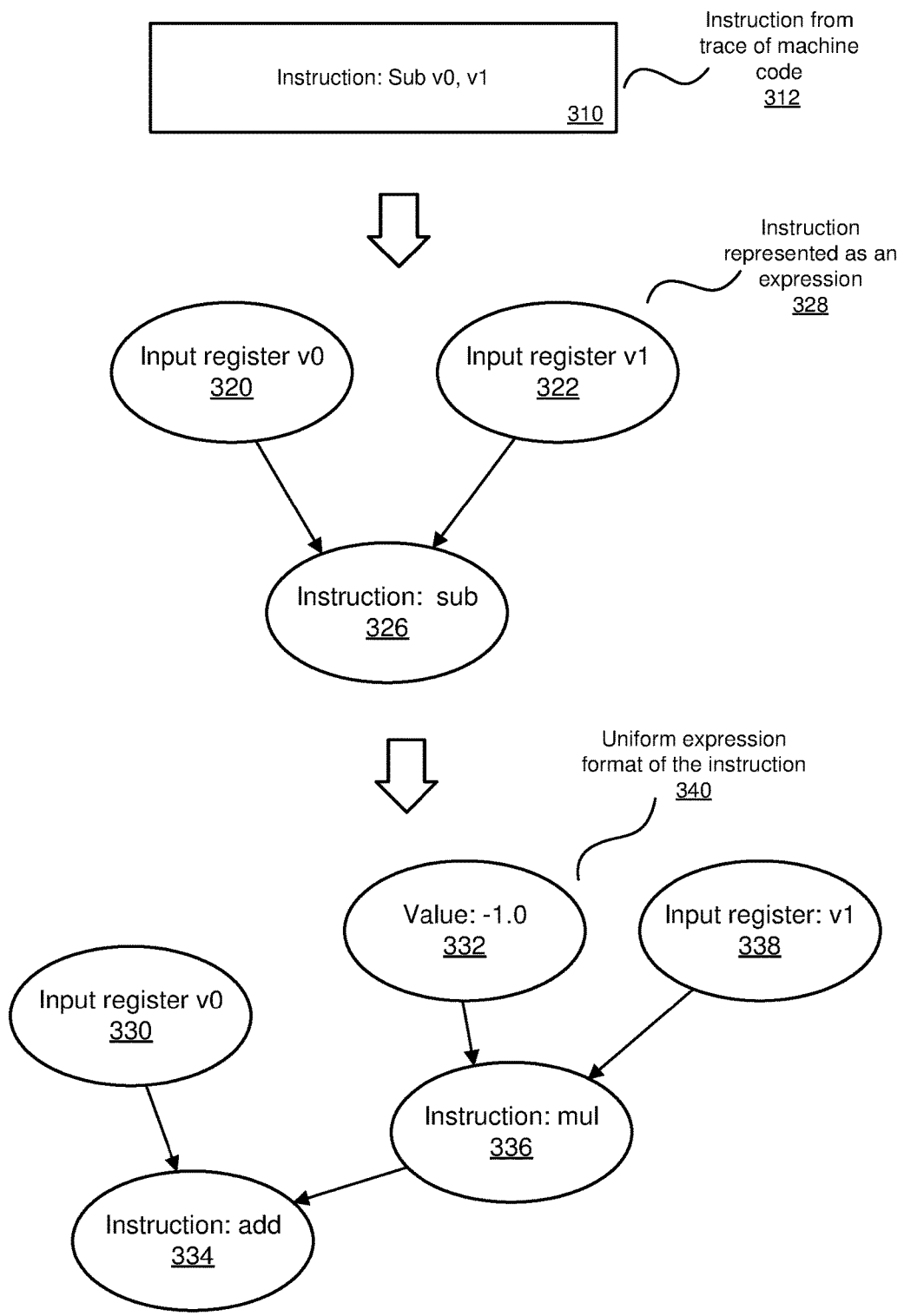
FIG. 3 is a diagram depicting an example transformation of a SUB instruction from a machine code trace into an expression in the uniform expression format.

FIG. 3 is a diagram depicting an example transformation of a subtract (SUB) instruction from a machine code trace into an expression in the uniform expression format. As depicted at 312, the instruction from the machine code trace is a SUB instruction 310 that is a single instruction for subtracting one operand from another. Specifically, the SUB instruction 310 subtracts input register v1 from input register v0.

As depicted at 328, the SUB instruction 310 has been converted into an expression, which can also be called an intermediate expression. The expression represents the SUB instruction 310, but it is not yet in the uniform expression format. The expression depicts the SUB instruction at 326 along with the two operands, the input register v0 320 and the input register v1 322.

As depicted at 340, the SUB instruction 310 has been converted into the uniform expression format. Specifically, the SUB instruction 310 has been converted into an expression in the uniform expression format that uses two separate instructions. The first instruction is a MUL instruction 336 that multiplies input register v1 338 with the value of −1.0 332. The second instruction is an ADD instruction 334 that adds the result of the MUL instruction 336 and input register v0 330.

As illustrated by FIG. 3, the instruction 310 from the machine code trace has the same semantic meaning as the expression, depicted at 340, in the uniform expression format. Specifically, both the instruction 310 and the expression depicted at 340 result in input register v1 being subtracted from input register v0.

Converting the instructions from the machine code trace into expressions in the uniform expression format allows the machine code traces to be compared more efficiently. For example, one compiler could create machine code instructions that use SUB instructions while a second compiler could create machine code instructions that do not use SUB instructions (e.g., that use separate MUL and ADD instructions instead). Comparing such machine code traces directly would result in many differences between the use of SUB versus MUL and ADD instructions. By converting both to the uniform expression format, where SUB instructions are transformed to expressions using MUL and ADD instructions, the two sets of expressions (one from each of the machine code traces) can be directly compared.

Depending on the compilers being used, different instructions may be present in the generated machine code and subsequent traces. FIGS. 2 and 3 are only two examples of how specific instructions can be transformed into expressions in the uniform expression format. Other implementations can transform different instructions into corresponding expressions in the uniform expression format so long as the expressions in the uniform expression format have the same semantic meaning as the corresponding instructions from the machine code traces. For example, in some implementations a single buffer_load×4 instruction will be expanded into an expression that uses four buffer_load instructions and a merge instruction to merge the result. In some implementations the instruction cmp_ge operand1, operand2 will be expanded into the following expression in the uniform expression format cmp_lt operand2, operand1. In some implementations the endmask false_val, true_val, condition will be expanded into true_val or false_val in the uniform expression format depending on the value of the condition at the trace step.

In some implementations, some of the instructions from the machine code trace are transformed into expressions in the uniform expression format that use the same instructions. For example, a move (MOV) instruction in the trace could be transformed into an expression in the uniform expression format that also uses a MOV instruction.

Transforming Instructions into the Uniform Expression Format

In the technologies described herein, machine code traces are transformed into expressions in the uniform expression format. FIG. 4 depicts an example trace 410 of machine code generated by a compiler. The example trace 410 is just one example of the type of instructions that can be generated from a trace of machine code generated for a particular graphics processing unit (GPU) architecture, and only depicts a number of example trace instructions. For example, trace instruction 489 (identified as Step (489) in the trace) in a specific type of multiply instruction that multiplies the values of input registers v29 and v18 and outputs the result into output register v27. As the example illustrates, the example trace 410 includes instructions as well as the associated input and output registers, register values, and static values.

In some implementations, the first procedure when transforming the instructions from the trace of machine code into expressions in the uniform expression format is to translate each of the instructions into corresponding expressions. For example, each of the instructions can be translated into corresponding expressions in the uniform expression format in the order they are present in the trace. Translating some types of instructions may involve generating expressions that include a number of instructions (e.g., translating a MAD instruction into an expression that uses both MUL and ADD instructions), while other types of instructions (e.g., MOV instructions) may be translated as-is.

In some implementations, merging and sorting procedures are performed on the expressions after they have been translated into the uniform expression format. With the merge procedure, multiple instances of an expression type are merged into a single instance of the expression type in the uniform expression format. For example, a number of MUL expressions may occur together (e.g., a directly dependent sequence of MUL expressions) and therefore can be grouped together using a single MUL expression. For example, a first MUL expression could multiple input registers v0 and v1, a second MUL expression could multiple the result of the first MUL expression with input register v2, and a third MUL expression could multiply the result of the second MUL expression with input register s0. These three MUL expression could be combined into a single MUL expression that multiplies input registers v0, v1, v2, and s0 together. Other implementations can perform merge operations for additional and/or different expression types.

With the sorting procedure the input operands of the merged expressions are sorted into a uniform order. For example, merged expressions from different traces may have different input operand orders which can make comparison difficult. In order to order the input operands, a number of pre-defined criteria can be used. In some implementations, the criteria include one or more of the following:

Order input operands by register name (e.g., use string compare operations to place in alphanumeric order).

Order input operands by their depth in the tree (e.g., order with highest depth last). Depth indicates how many nodes are above a given input operand in the tree (e.g., in some situations, an input operand may depend on other instructions, so will have nodes above it in the tree).

For input operands that are values, and not register names, order them by their values (e.g., in numerical order).

Order input operands based on the opcodes. For example, the opcodes can be compared based on their names (e.g., MAD, MUL, etc.). As another example, the opcodes can be compared using their identifiers (e.g., the identifier for MAD could be 37 and the identifier for MUL could be 12).

In some implementations, the ordering criteria are themselves applied in an order. For example, input operands that are values can be ordered first in numerical order, followed by input operands ordered by register name for those operands that do not depend on other nodes, followed by input operands ordered by their depth in the tree.

In some implementations, optimization procedures are performed on the expressions after they have been translated into the uniform expression format. If merging and/or sorting procedures are performed, then the optimization procedures could be performed before and/or after the merging and/or sorting. Performing optimizations may be needed because different compilers perform different optimizations and therefore may be difficult to compare. One example optimization is to translate an expression that multiplies by zero into an expression with just a zero value. Another example type of optimization (illustrated using source code instructions) will translate the following:

a=1
x=a>0?2:1 into the expression:

x=2.

Another example type of optimization will translate the following:

abs(a)*abs(b)

into the expression:

abs(a*b).

Another example type of optimization will translate the following:

(a+5)<<4 into the expression:

a<<4+60.

After the traces have been transformed into the sets of expressions in the uniform expression format, the sets of expressions can be directly compared. In some implementations, the sets of expressions are converted from a tree format into a text format for the comparison.

FIG. 5 depicts an example comparison 500 between sets of expressions in the uniform expression format. At 510, a first set of expressions (generated from a first trace of machine code from a first compiler) is depicted. At 520, a second set of expressions (generated from a second trace of machine code from a second compiler) is depicted. The first and second sets of expressions are in a text format (e.g., converted from a tree format).

The first and second sets of expressions are in the uniform expression format and therefore can be directly compared. For example, they can be compared using string comparison tools. Results of the comparison can be presented. At 530, a result of the comparison is depicted which is an indication of where the first and second sets of expressions differ. Specifically, there are a number of instructions where operands differ (attr0 versus attr1) between the first set of expression and the second set of expressions.

Methods for Semantically Comparing Machine Code Traces

In any of the examples herein, methods can be provided for semantically comparing machine code traces from different compilers by converting them to a uniform expression format.

FIG. 6 is a flowchart of an example method 600 for semantically comparing machine code traces. The example method 600 can be performed, at least in part, by a computing device.

At 610, a first trace of machine code is received. The first trace is generated by a first compiler and comprises a plurality of instructions. For example, the first compiler could be a compiler under development.

At 615, the first trace is transformed into a first set of expressions in the uniform expression format. The first set of expressions has the same semantic meaning as the instructions of the first trace. In order to transform the first trace into the first set of expressions, the instructions of the trace are first translated into corresponding expressions in the uniform expression format, as depicted at 620. Next, multiple instances of expression types are merged into corresponding single instances of the expression types, as depicted at 625. For example, multiple instances of a MUL expression type (e.g., multiple consecutive instances) can be merged into a single instance of the MUL expression type. Next, input operands of the merged single instances of the expression types are sorted into a uniform order, as depicted at 630. In some implementations, additional processing is performed on the first set of expressions, such as optimizations.

At 635, a second trace of machine code is received. The second trace is generated by a second compiler and comprises a plurality of instructions. For example, the second compiler could be a reference compiler.

At 640, the second trace is transformed into a second set of expressions in the uniform expression format. The second set of expressions has the same semantic meaning as the instructions of the second trace. In order to transform the second trace into the second set of expressions, the instructions of the trace are first translated into corresponding expressions in the uniform expression format, as depicted at 645. Next, multiple instances of expression types are merged into corresponding single instances of the expression types, as depicted at 650. For example, multiple instances of a MUL expression type (e.g., multiple consecutive instances) can be merged into a single instance of the MUL expression type. Next, input operands of the merged single instances of the expression types are sorted into the uniform order, as depicted at 655. In some implementations, additional processing is performed on the second set of expressions, such as optimizations.

At 660, the first set of expressions in the uniform expression format are compared with the second set of expressions in the uniform expression format. For example, both sets of expressions can be converted into a text format and compared directly. Other types of comparisons can be performed as well, such as a comparison of the sets of expressions in a tree format.

At 665, a result of the comparison is output. The result comprises an indication of whether the first set of expressions matches the second set of expressions. For example, the result can comprise a message stating that the first set of expressions matches, or does not match, the second set of expressions. The result can comprise portions of the first set of expressions and/or the second set of expressions (e.g., depicting which expressions match and/or which expressions do not match). One example result is depicted in FIG. 5.

For example, the example method 600 can be performed to determine whether the first compiler is operating correctly by semantically comparing its output to the output of the second compiler.

Figure 7:
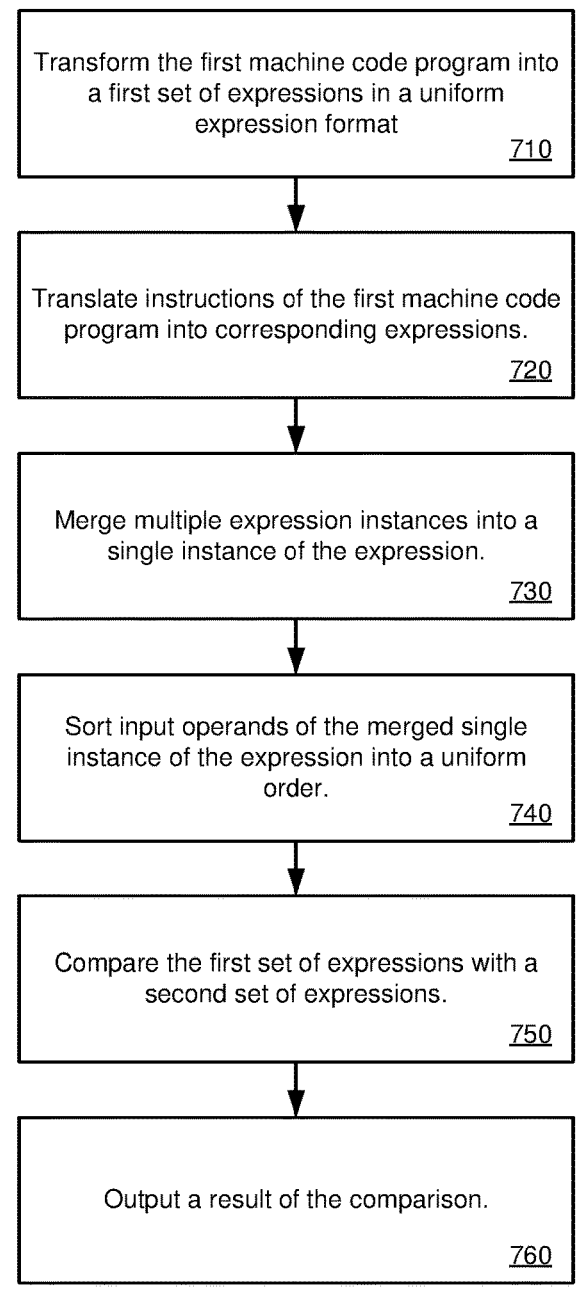
FIG. 7 is a flowchart of an example method for semantically comparing machine code programs using the uniform expression format.

FIG. 7 is a flowchart of an example method 700 for semantically comparing machine code programs. In some implementations, the instructions of the machine code program are transformed into the uniform expression format and compared without generating traces of the instructions. In some implementations, traces are generated from the instructions of the machine code program, and the trace instructions are then transformed into the uniform expression format and compared. The example method 700 can be performed, at least in part, by a computing device.

At 710, a first machine code program is transformed into a first set of expressions in the uniform expression format. The first machine code program is generated by a first compiler and comprises a plurality of instructions. The first set of expressions has the same semantic meaning as the instructions of the first machine code program.

At 720, as part of transforming the first machine code program into the first set of expressions, the instructions of the machine code program are translated into corresponding expressions in the uniform expression format. For example, each of the instructions of the first machine code program can be translated into a corresponding expression. The types of translations depend on the specific machine code instructions being generated by the compilers. Example translations are depicted in FIGS. 2 and 3 for two specific machine code instructions.

At 730, multiple expression instances are merged into a single expression instance. The multiple expression instances have the same expression type. For example, multiple instances of a MUL expression type can be merged into a single instance of the MUL expression type. Merging can be done for one or more expression types (e.g., for MUL expression types and ADD expression types).

At 740, input operands of the merged single instances are sorted into a uniform order. For example, the input operands of a merged MUL expression can be sorted into the uniform order.

At 750, the first set of expressions in the uniform expression format are compared with a second set of expressions in the uniform expression format. The second set of expressions is generated from a second machine code program from a second compiler. Both sets of expressions can be converted into a text format and compared directly. Other types of comparisons can be performed as well, such as a comparison of the sets of expressions in a tree format.

At 760, a result of the comparison is output. The result comprises an indication of whether the first set of expressions matches the second set of expressions. For example, the result can comprise a message stating that the first set of expressions matches, or does not match, the second set of expressions. The result can comprise portions of the first set of expressions and/or the second set of expressions (e.g., depicting which expressions match and/or which expressions do not match). One example result is depicted in FIG. 5.

Figure 8:
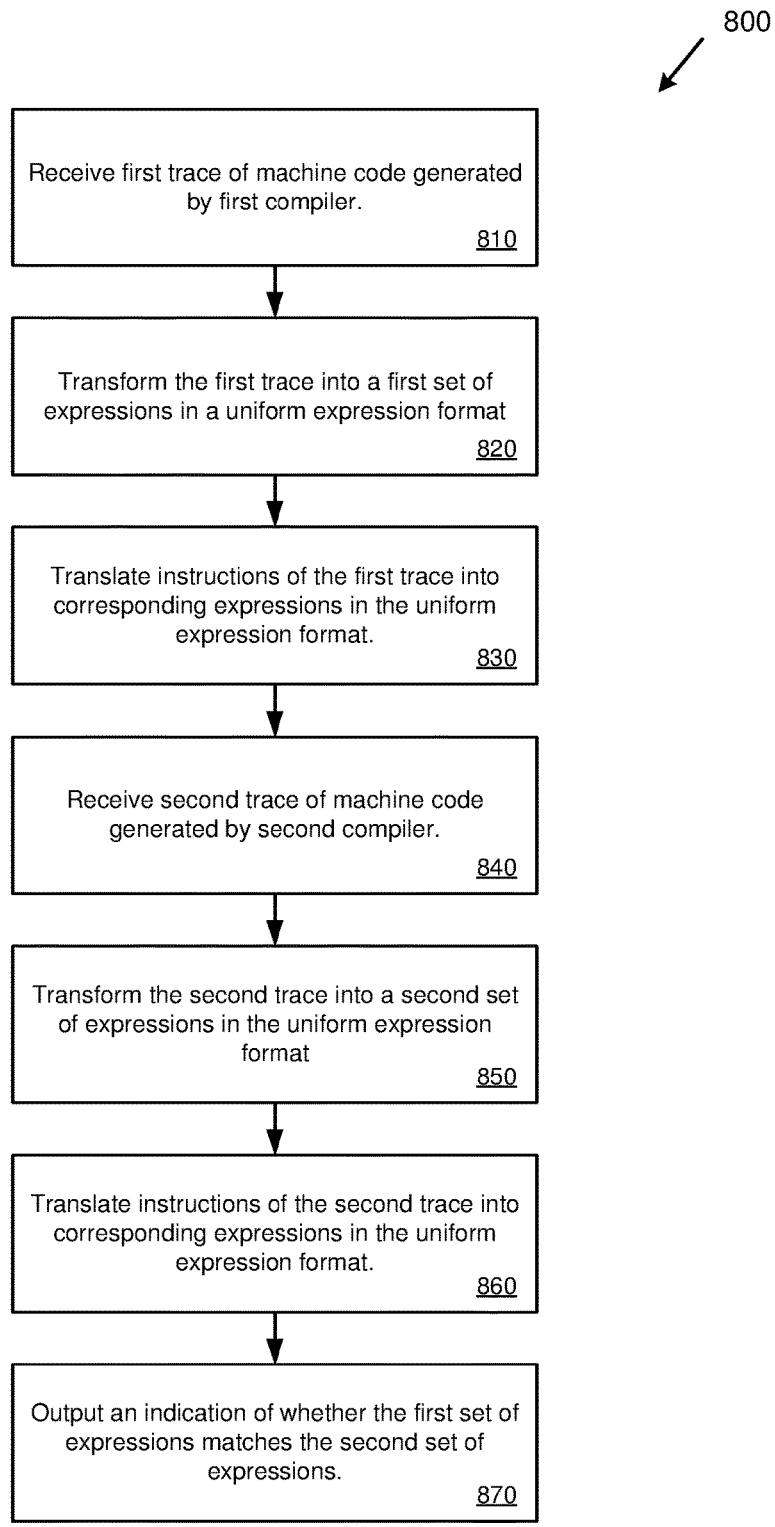
FIG. 8 is a flowchart of an example method for semantically comparing machine code traces using the uniform expression format.

FIG. 8 is a flowchart of an example method 800 for semantically comparing machine code traces. The example method 800 can be performed, at least in part, by a computing device.

At 810, a first trace of machine code is received. The first trace is generated by a first compiler and comprises a plurality of instructions. For example, the first compiler could be a compiler under development.

At 820, the first trace is transformed into a first set of expressions in the uniform expression format. The first set of expressions has the same semantic meaning as the instructions of the first trace. Translating the first trace into the first set of expressions in the uniform expression format comprises translating the instructions of the first trace into corresponding expressions in the uniform expression format, as depicted at 830. For example, each of the instructions of the first trace can be translated into a corresponding expression. Translating the first trace into the first set of expressions in the uniform expression format can comprise additional operations. For example, merging, sorting, and/or optimization operations can be performed.

At 840, a second trace of machine code is received. The second trace is generated by a second compiler and comprises a plurality of instructions. For example, the second compiler could be a reference compiler.

At 850, the second trace is transformed into a second set of expressions in the uniform expression format. The second set of expressions has the same semantic meaning as the instructions of the second trace. Translating the second trace into the second set of expressions in the uniform expression format comprises translating the instructions of the second trace into corresponding expressions in the uniform expression format, as depicted at 860. For example, each of the instructions of the second trace can be translated into a corresponding expression. Translating the second trace into the second set of expressions in the uniform expression format can comprise additional operations. For example, merging, sorting, and/or optimization operations can be performed.

At 870, an indication of whether the first set of expressions matches the second set of expressions is output. For example, the indication can comprise a message (e.g., a text or graphical message indicating that the sets of expression match or do not match). The indication can comprise portions of the first set of expressions and/or the second set of expressions (e.g., depicting which expressions match and/or which expressions do not match). One example indication is depicted in FIG. 5.

In some implementations, semantically comparing machine code traces comprises performing operations comprising: transforming a first trace of machine code generated by a first compiler into a first set of expressions in a uniform expression format that have the same semantic meaning as the first trace, where the first trace comprises a plurality of instructions. The transforming can comprise, for each of the plurality of instructions of the first trace, translating the instruction into an expression of the instruction in the uniform expression format, merging multiple expression instances, having the same expression type, into a single instance of the expression in the uniform expression format, and sorting input operands of the merged single instance of the expression into a uniform order. The operations can further comprise comparing the first set of expressions in the uniform expression format to a second set of expressions in the uniform expression format. The operations can further comprise outputting a result of the comparison comprising an indication of whether the first set of expressions in the uniform expression format matches the second set of expressions in the uniform expression format.

Computing Systems

Figure 9:
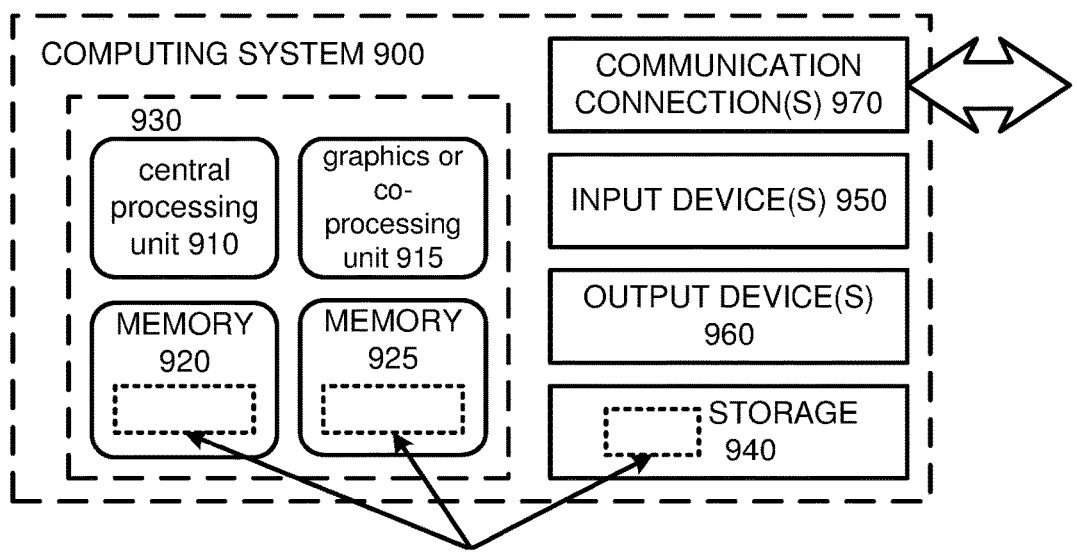
FIG. 9 is a diagram of an example computing system in which some described embodiments can be implemented.

FIG. 9 depicts a generalized example of a suitable computing system 900 in which the described technologies may be implemented. The computing system 900 is not intended to suggest any limitation as to scope of use or functionality, as the technologies may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more technologies described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more technologies described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections, such as 970.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processing unit; and
memory;
the computing device configured, via computer-executable instructions, to perform operations for semantically comparing machine code traces, the operations comprising:
receiving a first trace of machine code generated by a first compiler, wherein the first trace comprises a plurality of executed instructions, and wherein the first trace of machine code is generated by executing the machine code on the or another computing device to obtain the first trace comprising the plurality of executed instructions;
transforming the first trace into a first set of expressions in a uniform expression format that have the same semantic meaning as the first trace, comprising:
for each of the plurality of executed instructions of the first trace, translating the executed instruction into an expression of the executed instruction in the uniform expression format;
merging multiple instances of one or more expression types into corresponding single instances of the one or more expression types in the uniform expression format; and
sorting input operands of the merged single instances of the one or more expression types into a uniform order;
receiving a second trace of machine code generated by a second compiler, wherein the second trace comprises a plurality of executed instructions, and wherein the second trace of machine code is generated by executing the machine code on the or another computing device to obtain the second trace comprising the plurality of executed instructions;
transforming the second trace into a second set of expressions in the uniform expression format that have the same semantic meaning as the second trace, comprising:
for each of the plurality of executed instructions of the second trace, translating the executed instruction into an expression of the executed instruction in the uniform expression format;
merging multiple instances of one or more expression types into corresponding single instances of the one or more expression types in the uniform expression format; and
sorting input operands of the merged single instances of the one or more expression types into the uniform order;
comparing the first set of expressions in the uniform expression format to the second set of expressions in the uniform expression format; and
outputting a result of the comparison comprising an indication of whether the first set of expressions in the uniform expression format matches the second set of expressions in the uniform expression format.

2. The computing device of claim 1 wherein translating the executed instruction into an expression of the executed instruction in the uniform expression format comprises: translating a single multiply and add (MAD) executed instruction into an expression in the uniform expression format that uses both a multiply (MUL) instruction and an add (ADD) instruction.

3. The computing device of claim 1 wherein translating the executed instruction into an expression of the executed instruction in the uniform expression format comprises:
translating a single subtract (SUB) executed instruction into an expression in the uniform expression format that uses both an add (ADD) instruction and a multiply (MUL) instruction.

4. The computing device of claim 1 wherein merging multiple instances of one or more expression types into corresponding single instances of the one or more expression types in the uniform expression format comprises merging multiple instances of multiply (MUL) expressions or multiple instances of add (ADD) expressions.

5. The computing device of claim 1 wherein merging multiple instances of one or more expression types into corresponding single instances of the one or more expression types in the uniform expression format comprises:
identifying multiple multiply (MUL) expression instances;
creating a single MUL expression instance in the uniform expression format from the identified multiple MUL expression instances.

6. The computing device of claim 1 wherein sorting input operands of the merged single instances of the one or more expression types into the uniform order comprises:
sorting input operands for merged multiply (MUL) expressions; and
sorting input operands for merged add (ADD) expressions.

7. The computing device of claim 1 wherein the uniform expression format uses a tree structure for representing the transformed first and second traces.

8. The computing device of claim 1 wherein the result of the comparison comprises a sequence of text instructions of the first set of expressions in the uniform expression format and a corresponding sequence of text instructions of the second set of expressions in the uniform expression format.

9. The computing device of claim 1 wherein the first compiler is a compiler being tested and wherein the second compiler is a reference compiler.

10. The computing device of claim 1 wherein transforming the first trace into the first set of expressions in the uniform expression format further comprises performing one or more optimizations of the expressions in the uniform expression format, and wherein transforming the second trace into the second set of expressions in the uniform expression format further comprises performing one or more optimizations of the expressions in the uniform expression format.

11. A method, implemented by a computing device, for semantically comparing machine code traces, the method comprising:
receiving a first trace of machine code generated by a first compiler;
transforming the first trace of machine code generated by the first compiler into a first set of expressions in a uniform expression format that have the same semantic meaning as the first trace of machine code, wherein the first trace comprises a plurality of executed instructions, and wherein the first trace of machine code is generated by executing the machine code on the or another computing device to obtain the first trace comprising the plurality of executed instructions, the transforming comprising:
- for each of the plurality of executed instructions of the first trace, translating the executed instruction into an expression of the executed instruction in the uniform expression format;
- merging multiple expression instances, having the same expression type, into a single instance of the expression in the uniform expression format; and
- sorting input operands of the merged single instance of the expression into a uniform order;

receiving a second trace of machine code generated by a second compiler;

transforming the second trace of machine code generated by the second compiler into a second set of expressions in a uniform expression format that have the same semantic meaning as the second trace of machine code, wherein the second trace comprises a plurality of executed instructions, and wherein the second trace of machine code is generated by executing the machine code on the or another computing device to obtain the second trace comprising the plurality of executed instructions, the transforming comprising:
- for each of the plurality of executed instructions of the second trace, translating the executed instruction into an expression of the executed instruction in the uniform expression format;
- merging multiple expression instances, having the same expression type, into a single instance of the expression in the uniform expression format; and
- sorting input operands of the merged single instance of the expression into a uniform order;

comparing the first set of expressions in the uniform expression format to the second set of expressions in the uniform expression format; and outputting a result of the comparison comprising an indication of whether the first set of expressions in the uniform expression format matches the second set of expressions in the uniform expression format.

12. The method of claim 11 wherein translating the executed instruction into an expression of the executed instruction in the uniform expression format comprises:
- translating a single multiply and add (MAD) executed instruction into an expression in the uniform expression format that uses both a multiply (MUL) instruction and an add (ADD) instruction.

13. The method of claim 11 wherein merging multiple expression instances comprises merging multiple instances of multiply (MUL) expressions or multiple instances of add (ADD) expressions.

14. A computer-readable storage medium storing computer-executable instructions for execution on a computing device to perform operations for semantically comparing machine code traces, the operations comprising:
- receiving a first trace of machine code generated by a first compiler, wherein the first trace comprises a plurality of executed instructions, and wherein the first trace of machine code is generated by executing the machine code on the or another computing device to obtain the first trace comprising the plurality of executed instructions;
- transforming the first trace into a first set of expressions in a uniform expression format that have the same semantic meaning as the first trace, comprising:
  - for each of the plurality of executed instructions of the first trace, translating the executed instruction into an expression of the executed instruction in the uniform expression format;
  - merging multiple instances of one or more expression types into corresponding single instances of the one or more expression types in the uniform expression format; and
  - sorting input operands of the merged single instances of the one or more expression types into a uniform order;
- receiving a second trace of machine code generated by a second compiler, wherein the second trace comprises a plurality of executed instructions, and wherein the second trace of machine code is generated by executing the machine code on the or another computing device to obtain the second trace comprising the plurality of executed instructions;
- transforming the second trace into a second set of expressions in the uniform expression format that have the same semantic meaning as the second trace, comprising:
  - for each of the plurality of executed instructions of the second trace, translating the executed instruction into an expression of the executed instruction in the uniform expression format;
  - merging multiple instances of one or more expression types into corresponding single instances of the one or more expression types in the uniform expression format; and
  - sorting input operands of the merged single instances of the one or more expression types into the uniform order;
- comparing the first set of expressions in the uniform expression format to the second set of expressions in the uniform expression format; and
- outputting an indication of whether the first set of expressions in the uniform expression format matches the second set of expressions in the uniform expression format.

15. The computer-readable storage medium of claim 14 wherein merging multiple instances of one or more expression types into corresponding single instances of the one or more expression types in the uniform expression format comprises merging multiple instances of mul (multiply) expressions or multiple instances of add expressions.

16. The computer-readable storage medium of claim 14 wherein translating the executed instruction into an expression of the executed instruction in the uniform expression format comprises:
- translating a single multiply and add (MAD) executed instruction into an expression in the uniform expression format that uses both a multiply (MUL) instruction and an add (ADD) instruction.

* * * * *